US012697981B2

(12) United States Patent
Lee et al.

(10) Patent No.: US 12,697,981 B2
(45) Date of Patent: Aug. 4, 2026

(54) APPARATUS FOR ESTIMATING VEHICLE WEIGHT AND METHOD THEREFOR

(71) Applicants: HYUNDAI MOTOR COMPANY, Seoul (KR); KIA CORPORATION, Seoul (KR)

(72) Inventors: Min Hyuk Lee, Goyang-si (KR); Byeong Wook Jeon, Seoul (KR); Dong Hoon Jeong, Seongnam-si (KR); Ye Seul Park, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 288 days.

(21) Appl. No.: 18/517,707

(22) Filed: Nov. 22, 2023

(65) Prior Publication Data

US 2025/0074432 A1 Mar. 6, 2025

(30) Foreign Application Priority Data

Sep. 5, 2023 (KR) ........................ 10-2023-0117813

(51) Int. Cl.
*B60W 40/00* (2006.01)
*B60W 40/107* (2012.01)
(Continued)

(52) U.S. Cl.
CPC .......... *B60W 40/13* (2013.01); *B60W 40/107* (2013.01); *B60W 50/00* (2013.01);
(Continued)

(58) Field of Classification Search
CPC .... B60W 40/13; B60W 40/107; B60W 50/00; B60W 2050/0031; B60W 2520/105;
(Continued)

(56) References Cited

U.S. PATENT DOCUMENTS 11,754,434 B1 * 9/2023 Hwang .................. G01G 19/08
                                                    702/175
2004/0006421 A1 * 1/2004 Yanase .................... B60T 8/172
                                                    701/124
(Continued)

FOREIGN PATENT DOCUMENTS

EP         4385790 A1 * 6/2024 .......... B60L 15/2009
JP     2021168532 A * 10/2021 ............. G01M 1/12
WO WO-2022257310 A1 * 12/2022 ............. G06F 17/11

OTHER PUBLICATIONS

Avrutskiy, V.I. "Enhancing function approximation abilities of neural networks by training derivatives." IEEE transactions on neural networks and learning systems 32.2 (2020): 916-924.
(Continued)

*Primary Examiner* — Peter D Nolan
*Assistant Examiner* — Peter Y Ning
(74) *Attorney, Agent, or Firm* — MCDONNELL BOEHNEN HULBERT & BERGHOFF LLP

(57) ABSTRACT

An apparatus for estimating a vehicle weight includes a memory storing computer-executable instructions and at least one processor that accesses the memory and executes the instructions. The at least one processor applies a real velocity and real acceleration to a trained real-to-virtual transformation model to obtain a virtual output set at a target time point, which includes a virtual gradient of a vehicle, a virtual velocity of the vehicle, and virtual longitudinal acceleration of the vehicle, and applies the virtual output set at the target time point and a real wheel torque at the target time point to a trained mass estimation model to obtain weight information of the vehicle. The real-to-virtual transformation model includes a first sub-model for obtaining an initial virtual velocity, a second sub-model for obtaining the
(Continued)

virtual longitudinal acceleration, and a third sub-model for obtaining the virtual gradient.

16 Claims, 10 Drawing Sheets

(51) Int. Cl.

| | |
|---|---|
| *B60W 40/13* | (2012.01) |
| *B60W 50/00* | (2006.01) |
| *G06F 17/17* | (2006.01) |
| *G06N 3/04* | (2023.01) |

(52) U.S. Cl.
CPC ............... *G06F 17/17* (2013.01); *G06N 3/04* (2013.01); *B60W 2050/0031* (2013.01); *B60W 2520/105* (2013.01); *B60W 2520/30* (2013.01); *B60W 2530/10* (2013.01)

(58) Field of Classification Search
CPC ......... B60W 2520/30; B60W 2530/10; B60W 2520/10; B60W 2552/15; B60W 40/10; G06F 17/17; G06N 3/04; G06N 3/044; G06N 3/045; G06N 3/084; G06N 3/0442; G06N 3/0464
See application file for complete search history.

(56) References Cited

U.S. PATENT DOCUMENTS

| | | | | |
|---|---|---|---|---|
| 2011/0218764 | A1* | 9/2011 | Fujita | G01G 19/086 |
| | | | | 702/175 |
| 2014/0067155 | A1* | 3/2014 | Yu | B60W 40/13 |
| | | | | 701/1 |
| 2016/0082964 | A1* | 3/2016 | Chunodkar | B60W 40/13 |
| | | | | 701/70 |
| 2016/0096446 | A1* | 4/2016 | Yamazaki | B60L 15/2081 |
| | | | | 903/902 |
| 2019/0101903 | A1* | 4/2019 | Katti | G05B 19/4188 |
| 2022/0180249 | A1* | 6/2022 | Schiegg | G06N 3/094 |
| 2022/0312678 | A1* | 10/2022 | Faust | A01B 76/00 |
| 2024/0132054 | A1* | 4/2024 | Weston | B60W 30/02 |
| 2024/0182043 | A1* | 6/2024 | Ahangarnejad | B60W 40/13 |
| 2024/0324848 | A1* | 10/2024 | Chiba | A61B 1/000096 |
| 2025/0137835 | A1* | 5/2025 | Hayakawa | G07C 5/02 |

OTHER PUBLICATIONS

Goyal, P., Benner, P. "Learning dynamics from noisy measurements using deep learning with a Runge-Kutta constraint." arXiv preprint arXiv:2109.11446 (2021).
Vahidi, A., Stefanopoulou, A., Peng, H. "Recursive least squares with forgetting for online estimation of vehicle mass and road grade: theory and experiments." Vehicle System Dynamics 43.1 (2005): 31-55.

* cited by examiner

APPARATUS
100

PROCESSOR
110

MEMORY
120

INSTRUCTIONS
122

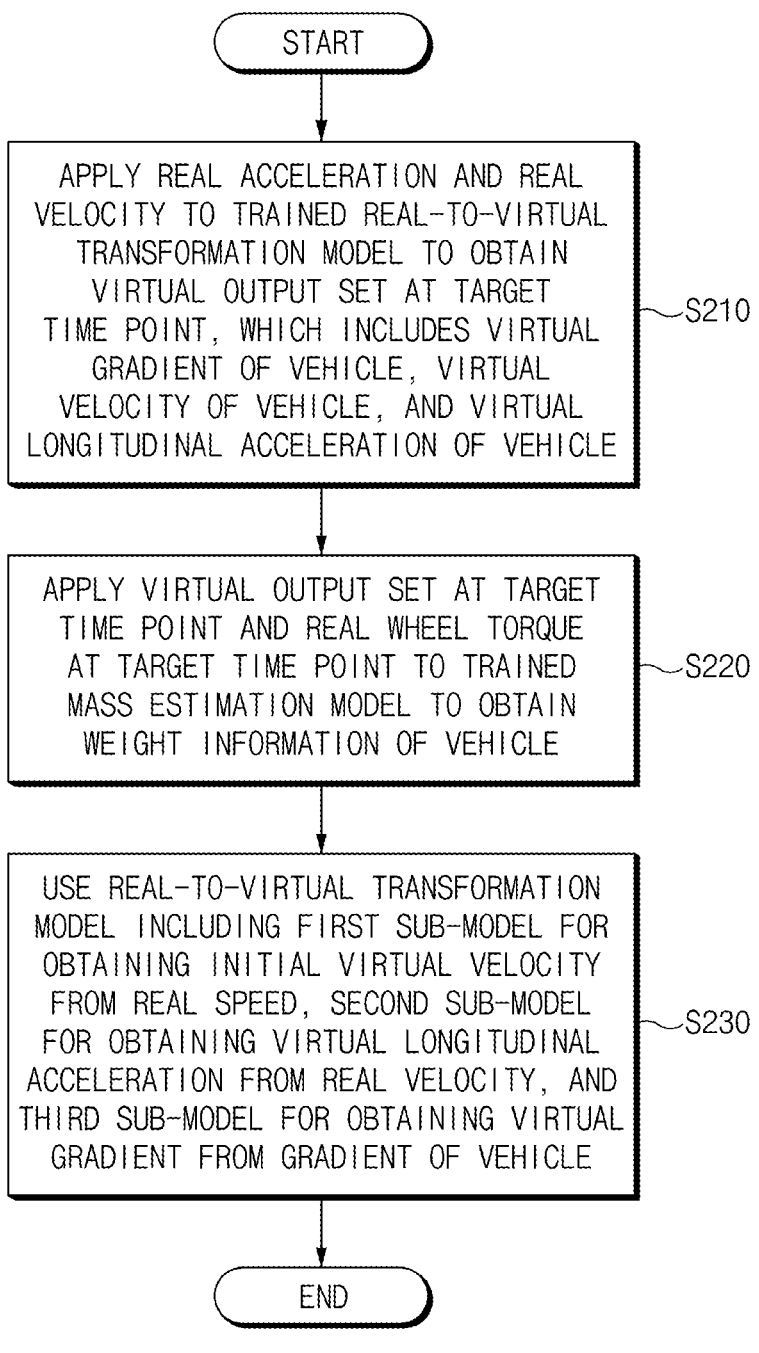

START

APPLY REAL ACCELERATION AND REAL
VELOCITY TO TRAINED REAL-TO-VIRTUAL
TRANSFORMATION MODEL TO OBTAIN
VIRTUAL OUTPUT SET AT TARGET
TIME POINT, WHICH INCLUDES VIRTUAL
GRADIENT OF VEHICLE, VIRTUAL
VELOCITY OF VEHICLE, AND VIRTUAL
LONGITUDINAL ACCELERATION OF VEHICLE    ~S210

APPLY VIRTUAL OUTPUT SET AT TARGET
TIME POINT AND REAL WHEEL TORQUE
AT TARGET TIME POINT TO TRAINED
MASS ESTIMATION MODEL TO OBTAIN
WEIGHT INFORMATION OF VEHICLE    ~S220

USE REAL-TO-VIRTUAL TRANSFORMATION
MODEL INCLUDING FIRST SUB-MODEL FOR
OBTAINING INITIAL VIRTUAL VELOCITY
FROM REAL SPEED, SECOND SUB-MODEL
FOR OBTAINING VIRTUAL LONGITUDINAL
ACCELERATION FROM REAL VELOCITY, AND
THIRD SUB-MODEL FOR OBTAINING VIRTUAL
GRADIENT FROM GRADIENT OF VEHICLE    ~S230

END

FIG.2

APPARATUS FOR ESTIMATING VEHICLE WEIGHT AND METHOD THEREFOR

CROSS-REFERENCE TO RELATED APPLICATION

This application claims the benefit of priority to Korean Patent Application No. 10-2023-0117813, filed in the Korean Intellectual Property Office on Sep. 5, 2023, the entire contents of which are incorporated herein by reference.

TECHNICAL FIELD

The present disclosure relates to an apparatus for estimating a vehicle weight and a method therefor, and more particularly, relates to technologies for estimating a weight of a vehicle.

BACKGROUND

It is important to accurately know a weight of a vehicle to accurately control a torque of the vehicle, while the vehicle is traveling. There are a method for measuring a weight of the vehicle and a method for estimating a weight of the vehicle based on a physical formula using a physical quantity generated while driving.

Particularly, because a separate sensor should be attached to the vehicle to measure a weight of the vehicle, the method for estimating the weight of the vehicle based on the physical formula is in the spotlight. Because the method for estimating the weight of the vehicle based on the physical formula estimates the weight of the vehicle using F (=Ma), there is a need to accurately calculate various resistance forces acting on the vehicle while driving and longitudinal acceleration of the vehicle.

However, because it is impossible to mathematically accurately model a resistance force generated while the vehicle is actually traveling and because accurate longitudinal acceleration is unable to known as a variety of noise and a gravitational acceleration component or the like unnecessary for weight calculation are included in a value measured by means of an acceleration sensor, there is a problem in which an error in estimation is large. To address such a problem, a state estimation algorithm based on the extended Kalman filter or the recursive least square is representatively used in an existing technology.

However, the above-mentioned mass estimation algorithm has a limitation in which an estimation result after estimation starts is greatly unstable according to a parameter setting necessary for tuning or in which it takes a lot of time to estimate a true value. Thus, an attempt to apply deep learning is performed to overcome the limitation of the above-mentioned state estimation algorithm.

The attempt to apply the deep learning may include the following problems. First, it may be difficult to actually collect various pieces of driving data necessary to train a deep learning model. Finally, because the training of the general deep learning model excludes a physical relationship between driving data and a weight, there may be a limitation in the accuracy of estimation and weight estimation performance of the vehicle may be greatly degraded for driving data which is not trained.

To address such problems, there is a need to develop a deep learning-based mass estimation model which address the two problems.

SUMMARY

The present disclosure has been made to solve the above-mentioned problems occurring in the prior art while advantages achieved by the prior art are maintained intact.

An aspect of the present disclosure provides an apparatus for estimating a vehicle weight to apply a small amount of real data to areal-to-virtual transformation model to obtain a large amount of simulation data and improve the accuracy of a deep learning model for estimating a physical quantity and predict changes in a braking distance, an acceleration characteristic, a cornering characteristic, and the like of the vehicle according to the estimated weight to improve the safety of the vehicle while driving and a method therefor.

Another aspect of the present disclosure provides an apparatus for estimating a vehicle weight to include longitudinal dynamics information in a loss function in the process of training a mass estimation model such that the mass estimation model may perform inference based on dynamics and a method thereof.

Another aspect of the present disclosure provides an apparatus for estimating a vehicle weight to predict a maintenance timing suitable for a part influenced by a weight among expendables of the vehicle, which require combined maintenance, using a real-to-virtual transformation model and a mass estimation model to improve vehicle management efficiency and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for estimating a vehicle weight may include a memory storing computer-executable instructions and at least one processor that accesses the memory and executes the instructions. The at least one processor may apply a real velocity and real acceleration to a trained real-to-virtual transformation model to obtain a virtual output set at a target time point, the virtual output set including a virtual gradient of a vehicle, a virtual velocity of the vehicle, and virtual longitudinal acceleration of the vehicle, and may apply the virtual output set at the target time point and a real wheel torque at the target time point to a trained mass estimation model to obtain weight information of the vehicle. The real-to-virtual transformation model may include a first sub-model for obtaining an initial virtual velocity from the real velocity, a second sub-model for obtaining the virtual longitudinal acceleration from the real velocity, and a third sub-model for obtaining the virtual gradient from a gradient of the vehicle.

In an embodiment, the at least one processor may apply the real velocity to the first sub-model to obtain the initial virtual velocity, may apply the real velocity to the second sub-model to obtain the virtual longitudinal acceleration, and may determine the virtual velocity, based on numerical integration of the virtual longitudinal acceleration and the initial virtual velocity.

In an embodiment, the at least one processor may determine a following gradient of the vehicle, based on the real acceleration and the virtual longitudinal acceleration, and may apply the following gradient to the third sub-model to obtain the virtual gradient.

In an embodiment, the first sub-model may include a deep convolutional neural network (DCNN), a flatten network, and a fully connected neural network (FCNN), the second sub-model may include a recurrent neural network (RNN) including at least one long short term memory (LSTM) block, or the third sub-model may include a DCNN and an FCNN.

In an embodiment, the at least one processor may determine a first loss function for training the real-to-virtual transformation model, based on at least one of weight information of the vehicle prior to the target time point, longitudinal acceleration of the vehicle prior to the target time point, a velocity of the vehicle prior to the target time point, or a gradient of the vehicle prior to the target time point, or any combination thereof.

In an embodiment, the at least one processor may train each of the first sub-model, the second sub-model, and the third sub-model included in the real-to-virtual transformation model, based on the first loss function. The first loss function may include at least one of a mean square error based on the weight information of the vehicle, a mean square error based on the longitudinal acceleration of the vehicle, a mean square error based on the velocity of the vehicle, or a mean square error based on the gradient of the vehicle, or any combination thereof.

In an embodiment, the at least one processor may determine a second loss function for training the mass estimation model, based on weight information of the vehicle prior to the target time point, a ratio between the weight information of the vehicle and a real wheel torque of the vehicle prior to the target time point, and a resistance force of the vehicle prior to the target time point.

In an embodiment, the second loss function may include at least one of a mean square error based on the weight information of the vehicle, a mean square error based on the ratio between the weight information of the vehicle and the real wheel torque of the vehicle, or a mean square error based on the resistance force of the vehicle, or any combination thereof.

In an embodiment, the mass estimation model may include an FCNN associated with obtaining the weight information of the vehicle and a resistance force of the vehicle from the virtual output set at the target time point and the real wheel torque at the target time point.

In an embodiment, the at least one processor may train the mass estimation model, before training the real-to-virtual transformation model, may apply the real velocity and the real acceleration to the real-to-virtual transformation model to obtain a first temporary output at a time point different from the target time point, based on that the training of the mass estimation model is completed, may apply the first temporary output to the trained mass estimation model to obtain a second temporary output different from the first temporary output, and may apply the first temporary output and the second temporary output to a loss function of the real-to-virtual transformation model to train the real-to-virtual transformation model.

According to another aspect of the present disclosure, a method for estimating a vehicle weight may include applying a real velocity and real acceleration to a trained real-to-virtual transformation model to obtain a virtual output set at a target time point, the virtual output set including a virtual gradient of a vehicle, a virtual velocity of the vehicle, and virtual longitudinal acceleration of the vehicle, and applying the virtual output set at the target time point and areal wheel torque at the target time point to a trained mass estimation model to obtain weight information of the vehicle. The real-to-virtual transformation model may include a first sub-model for obtaining an initial virtual velocity from the real velocity, a second sub-model for obtaining the virtual longitudinal acceleration from the real velocity, and a third sub-model for obtaining the virtual gradient from a gradient of the vehicle.

In an embodiment, the obtaining of the virtual output set may include applying the real velocity to the first sub-model to obtain the initial virtual velocity, applying the real velocity to the second sub-model to obtain the virtual longitudinal acceleration, and determining the virtual velocity, based on numerical integration of the virtual longitudinal acceleration and the initial virtual velocity.

In an embodiment, the method may further include determining a following gradient of the vehicle, based on the real acceleration and the virtual longitudinal acceleration, and applying the following gradient to the third sub-model to obtain the virtual gradient.

In an embodiment, the first sub-model may include a deep convolutional neural network (DCNN), a flatten network, and a fully connected neural network (FCNN), the second sub-model may include a recurrent neural network (RNN) including at least one long short term memory (LSTM) block, or the third sub-model may include a DCNN and an FCNN.

In an embodiment, the method may further include determining a first loss function for training the real-to-virtual transformation model, based on at least one of weight information of the vehicle prior to the target time point, longitudinal acceleration of the vehicle prior to the target time point, a velocity of the vehicle prior to the target time point, or a gradient of the vehicle prior to the target time point, or any combination thereof.

In an embodiment, the determining of the first loss function may include training each of the first sub-model, the second sub-model, and the third sub-model included in the real-to-virtual transformation model, based on the first loss function. The first loss function may include at least one of a mean square error based on the weight information of the vehicle, a mean square error based on the longitudinal acceleration of the vehicle, a mean square error based on the velocity of the vehicle, or a mean square error based on the gradient of the vehicle, or any combination thereof.

In an embodiment, the method may further include determining a second loss function for training the mass estimation model, based on weight information of the vehicle prior to the target time point, a ratio between the weight information of the vehicle and a real wheel torque of the vehicle prior to the target time point, and a resistance force of the vehicle prior to the target time point.

In an embodiment, the second loss function may include at least one of a mean square error based on the weight information of the vehicle, a mean square error based on the ratio between the weight information of the vehicle and the real wheel torque of the vehicle, or a mean square error based on the resistance force of the vehicle, or any combination thereof.

In an embodiment, the mass estimation model may include an FCNN associated with obtaining the weight information of the vehicle and a resistance force of the vehicle from the virtual output set at the target time point and the real wheel torque at the target time point.

In an embodiment, the method may further include training the mass estimation model, before training the real-to-virtual transformation model, applying the real velocity and the real acceleration to the real-to-virtual transformation model to obtain a first temporary output at a time point different from the target time point, based on that the training of the mass estimation model is completed, applying the first temporary output to the trained mass estimation model to obtain a second temporary output different from the first temporary output, and applying the first temporary output and the second temporary output to a loss function of the real-to-virtual transformation model to train the real-to-virtual transformation model.

BRIEF DESCRIPTION OF THE DRAWINGS

The above and other objects, features and advantages of the present disclosure will be more apparent from the following detailed description taken in conjunction with the accompanying drawings:

FIG. 2 is a flowchart for describing a method for estimating a vehicle weight according to an embodiment of the present disclosure;

Figure 1:
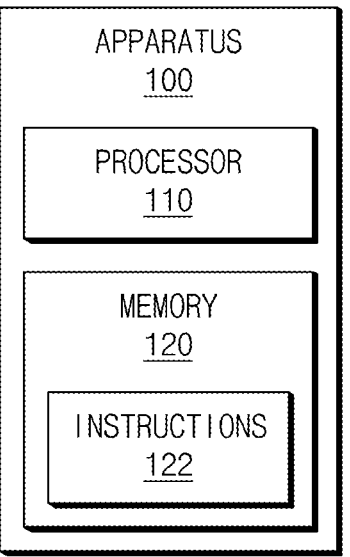
FIG. 1 is a drawing illustrating an apparatus for estimating a vehicle weight according to an embodiment of the present disclosure.

With regard to description of drawings, the same or similar denotations may be used for the same or similar components.

DETAILED DESCRIPTION

Hereinafter, some embodiments of the present disclosure will be described in detail with reference to the exemplary drawings. In the drawings, the same reference numerals will be used throughout to designate the same or equivalent components. In addition, a detailed description of well-known features or functions will be ruled out in order not to unnecessarily obscure the gist of the present disclosure. Hereinafter, various embodiments of the present disclosure may be described with reference to the accompanying drawings. However, it should be understood that this is not intended to limit the present disclosure to specific implementation forms and includes various modifications, equivalents, and/or alternatives of embodiments of the present disclosure. With regard to description of drawings, similar components may be marked by similar reference numerals.

In describing components of exemplary embodiments of the present disclosure, the terms first, second, A, B, (a), (b), and the like may be used herein. These terms are only used to distinguish one component from another component, but do not limit the corresponding components irrespective of the order or priority of the corresponding components. Furthermore, unless otherwise defined, all terms including technical and scientific terms used herein are to be interpreted as is customary in the art to which this present disclosure belongs. It will be understood that terms used herein should be interpreted as having a meaning that is consistent with their meaning in the context of this present disclosure and the relevant art and will not be interpreted in an idealized or overly formal sense unless expressly so defined herein. For example, the terms, such as "first", "second", "1st", "2nd", or the like used in the present disclosure may be used to refer to various components regardless of the order and/or the priority and to distinguish one component from another component, but do not limit the components. For example, a first user device and a second user device indicate different user devices, irrespective of the order and/or priority. For example, without departing the scope of the present disclosure, a first component may be referred to as a second component, and similarly, a second component may be referred to as a first component.

In the present disclosure, the expressions "have", "may have", "include" and "comprise", or "may include" and "may comprise" indicate existence of corresponding features (e.g., components such as numeric values, functions, operations, or parts), but do not exclude presence of additional features.

It will be understood that when a component (e.g., a component) is referred to as being "(operatively or communicatively) coupled with/to" or "connected to" another component (e.g., a second component), it can be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there is no intervening component (e.g., a third component).

According to the situation, the expression "configured to" used in the present disclosure may be used exchangeably with, for example, the expression "suitable for", "having the capacity to", "designed to", "adapted to", "made to", or "capable of".

The term "configured to" must not mean only "specifically designed to" in hardware. Instead, the expression "a device configured to" may mean that the device is "capable of" operating together with another device or other parts. For example, a "processor configured to perform A, B, and C" may mean a generic-purpose processor (e.g., a central processing unit (CPU) or an application processor) which may perform corresponding operations by executing one or more software programs which store a dedicated processor (e.g., an embedded processor) for performing a corresponding operation or a memory device. Terms used in the present disclosure are used to only describe specified embodiments and are not intended to limit the scope of another embodiment. The terms of a singular form may include plural forms unless the context clearly indicates otherwise. All the terms used herein, which include technical or scientific terms, may have the same meaning that is generally understood by a person skilled in the art described in the present disclosure. It will be further understood that terms, which are defined in a dictionary and commonly used, should also be interpreted as is customary in the relevant related art and not in an idealized or overly formal detect unless expressly so defined herein in various embodiments of the present disclosure. In some cases, even though terms are terms which are defined in the specification, they may not be interpreted to exclude embodiments of the present disclosure.

In the present disclosure, the expressions "A or B", "at least one of A or/and B", or "one or more of A or/and B", and the like may include any and all combinations of the associated listed items. For example, the term "A or B", "at least one of A and B", or "at least one of A or B" may refer to all of the case (1) where at least one A is included, the case (2) where at least one B is included, or the case (3) where both of at least one A and at least one B are included. Furthermore, in describing an embodiment of the present disclosure, each of such phrases as "A or B", "at least one of A and B", "at least one of A or B", "A, B, or C", "at least one of A, B, and C", "at least one of A, B, or C", and "at least one of A, B, or C, or any combination thereof" may include any one of, or all possible combinations of the items enumerated together in a corresponding one of the phrases. Particularly, the phrase such as "at least one of A, B, or C, or any combination thereof" may include "A", "B", or "C", or "AB" or "ABC", which is a combination thereof.

Hereinafter, embodiments of the present disclosure will be described in detail with reference to FIGS. 1 to 7.

FIG. 1 is a drawing illustrating an apparatus for estimating a vehicle weight according to an embodiment of the present disclosure.

An apparatus 100 for estimating a vehicle weight according embodiment may include a processor 110 and a memory 120 including instructions 122.

The apparatus 100 for estimating the vehicle weight may indicate an apparatus for estimating a weight of a vehicle. For example, the apparatus 100 for estimating the vehicle weight may include a real-to-virtual transformation model and a mass estimation model. In detail, the apparatus 100 for estimating the vehicle weight may estimate a weight of the vehicle, using the real-to-virtual transformation model and the mass estimation model.

The apparatus 100 for estimating the vehicle weight may apply pieces of data measured from a sensor to the real-to-virtual transformation model. Herein, the pieces of data measured from the sensor may include real acceleration measured from an acceleration sensor and a real velocity measured from a velocity sensor. In other words, the real acceleration may indicate acceleration of a vehicle which is actually operating, and the real velocity may indicate a velocity of the vehicle which is actually operating. Furthermore, the real-to-virtual transformation model may include a first sub-model, a second sub-model, and a third sub-model, which are independent of each other.

The apparatus 100 for estimating the vehicle weight may apply the real acceleration and the real velocity to the real-to-virtual transformation model. For example, the apparatus 100 for estimating the vehicle weight may apply the real acceleration and the real velocity to the real-to-virtual transformation model at a target time point, thus obtaining a virtual gradient, a virtual velocity, and virtual longitudinal acceleration. A virtual output set may include a virtual gradient, a virtual velocity, and virtual longitudinal acceleration. For convenience of description in the specification, the virtual output set is mainly described as including an output of the real-to-virtual transformation model.

The target time point may indicate a time point when the apparatus 100 for estimating the vehicle weight obtains the virtual output set from the real-to-virtual transformation model. In addition, the apparatus 100 for estimating the vehicle weight may apply the virtual output set obtained at the target time point to the mass estimation model which will be described below. For example, the apparatus 100 for estimating the vehicle weight may obtain weight information of the vehicle, using the trained real-to-virtual transformation model and the trained mass estimation model at the target time point. For reference, for convenience of description in the specification, the target time point is mainly described as a time point when inference of the real-to-virtual transformation model is performed, and a time point prior to the target time point is mainly described as a time point when the above-mentioned models are trained. Therefore, the time point prior to the target time point may indicate a time point when the above-mentioned models are trained, the target time point may indicate a time point when inference of the trained real-to-virtual transformation model is performed, and a time point subsequent to the target time point may indicate a time point when inference of the trained mass estimation model is performed. A detailed description of the training of the above-mentioned models will be given below with reference to FIG. 3.

Being virtual may indicate a simulation environment. For example, the virtual gradient may indicate a gradient of the vehicle in a simulation environment and may be different from a real gradient which is a gradient of the vehicle in an environment in which the real vehicle operates. Similarly, the virtual velocity may indicate a velocity of the vehicle in a simulation environment and may be different from a real velocity which is a velocity of the vehicle in an environment in which the real vehicle operates. For example, the virtual longitudinal acceleration may indicate longitudinal acceleration of the vehicle in a simulation environment and may be different from real longitudinal acceleration which is longitudinal acceleration of the vehicle in an environment in which the real vehicle operates.

The reason why the apparatus 100 for estimating the vehicle weight applies the real acceleration and the real velocity to the real-to-virtual transformation model is as follows. For example, the real acceleration may be a value measured from the acceleration sensor, which may include at least one noise, a component of gravitational acceleration unnecessary for weight estimation, and the like. When the apparatus 100 for estimating the vehicle weight directly uses real acceleration for weight estimation, because it is unable to accurately obtain longitudinal acceleration of the vehicle by noise and gravitational acceleration, there may occur an error in a result value (i.e., a weight) estimated by the apparatus 100 for estimating the vehicle weight. Therefore, the apparatus 100 for estimating the vehicle weight may more accurately and quickly estimate a weight of the vehicle than a state estimation algorithm based on the extended Kalman filter or the recursive least square, based on the virtual output set obtained by means of the real-to-virtual transformation model.

Furthermore, the apparatus 100 for estimating the vehicle weight may apply a small amount of data obtained in an environment in which the real vehicle operates (e.g., pieces of data measured from the sensor) to the real-to-virtual transformation model, thus obtaining a relatively large amount of data (e.g., a physical characteristic value or dynamics of the vehicle in a simulation environment). As a result, the apparatus 100 for estimating the vehicle weight may more accurately and quickly estimate the weight of the vehicle than the state estimation algorithm based on the extended Kalman filter or the recursive least square. For reference, a detailed description of the real-to-virtual transformation model will be given below with reference to FIG. 3.

The apparatus 100 for estimating the vehicle weight may apply the virtual output set at the target time point, which is obtained from the real-to-virtual transformation model, and a real wheel torque at the target time point, which is measured from the sensor, to the mass estimation model. Herein, the real wheel torque may indicate a torque generated between a wheel of the vehicle is actually operating and the road. The apparatus 100 for estimating the vehicle weight may apply the virtual output set and the real wheel torque to the mass estimation model, thus obtaining weight information of the vehicle. However, embodiments of the present disclosure are not limited thereto. The apparatus 100 for estimating the vehicle weight may apply the virtual output set and the real wheel torque to the mass estimation model, thus obtaining weight information of the vehicle and a resistance force of the vehicle.

For example, the weight information may include a weight of the vehicle and a weight ratio of the vehicle. In detail, the weight ratio of the vehicle may be a value (i.e., load weight/curb weight) determined from the curb weight of the vehicle and the load weight of the vehicle, which may indicate a ratio between the curb weight of the vehicle and the load weight of the vehicle. The apparatus 100 for estimating the vehicle weight may obtain a weight of the vehicle, based on the obtained weight ratio of the vehicle. Furthermore, the apparatus 100 for estimating the vehicle weight may obtain the weight ratio of the vehicle, thus obtaining power which belongs to a certain interval (e.g., power which belongs to the certain interval without applying normalization to be similar to power to which the normalization is applied) regardless of curb weights of various vehicles from the mass estimation model. The resistance force of the vehicle may indicate the sum of all resistance forces applied to the vehicle which is operating. The mass estimation model may be higher in accuracy when trained as a model which outputs the weight ratio of the vehicle and the resistance force of the vehicle than when trained as a model which outputs only the weight ratio of the vehicle. Therefore, hereinafter, the weight information is mainly described as the weight ratio of the vehicle for convenience of description in the specification, but an additional description will be in detail below with reference to FIG. 5.

The processor 110 may execute software and may control at least one other component (e.g., a hardware or software component) connected with the processor 110. In addition, the processor 110 may perform a variety of data processing or calculation. For example, the processor 110 may store the real-to-virtual transformation model, the mass estimation model, the real acceleration, the real velocity, the virtual gradient, the virtual velocity, the virtual longitudinal acceleration, the real wheel torque, the weight of the vehicle, the resistance force of the vehicle, and the like in the memory 120.

For reference, the processor 110 may perform all operations performed by the apparatus 100 for estimating the vehicle weight. Therefore, for convenience of description in the specification, the operation performed by the apparatus 100 for estimating the vehicle weight is mainly described as an operation performed by the processor 110. Furthermore, for convenience of description in the specification, the processor 110 is mainly described as, but not limited to, one processor. For example, the apparatus 100 for estimating the vehicle weight may include at least one processor. Each of the at least one processor may perform all operations associated with a vehicle weight estimation operation.

The memory 120 may temporarily and/or permanently store various pieces of data and/or information required to perform vehicle weight estimation. For example, the memory 120 may store the real-to-virtual transformation model, the mass estimation model, the real acceleration, the real velocity, the virtual gradient, the virtual velocity, the virtual longitudinal acceleration, the real wheel torque, the weight of the vehicle, the resistance force of the vehicle, and the like.

FIG. 2 is a flowchart for describing a method for estimating a vehicle weight according to an embodiment of the present disclosure.

In S210, an apparatus for estimating a vehicle weight (e.g., an apparatus 100 for estimating a vehicle weight in FIG. 1) may apply real acceleration and a real velocity to a trained real-to-virtual transformation model to obtain a virtual output set at a target time point, which includes a virtual gradient, a virtual velocity, and virtual longitudinal acceleration. In detail, the apparatus for estimating the vehicle weight may use the trained real-to-virtual transformation model to infer the virtual output set. A detailed description of it will be given below with reference to FIG. 3.

In S220, the apparatus for estimating the vehicle weight may apply the virtual output set at the target time point and a real wheel torque at the target time point to a trained mass estimation model to obtain weight information of a vehicle. In detail, the apparatus for estimating the vehicle weight may use the trained mass estimation model to infer weight information of the vehicle. A detailed description of it will be given below with reference to FIG. 3.

In S230, the apparatus for estimating the vehicle weight may use the real-to-virtual transformation model including a first sub-model, a second sub-model, and a third sub-model. In other words, the real-to-virtual transformation model may include the first sub-model, the second sub-model, and the third sub-model. Each of the first sub-model, the second sub-model, and the third sub-model may be used to infer at least one of a virtual gradient, a virtual velocity, or virtual longitudinal acceleration. A detailed description of it will be described below with reference to FIGS. 4A to 4C.

Figure 3:
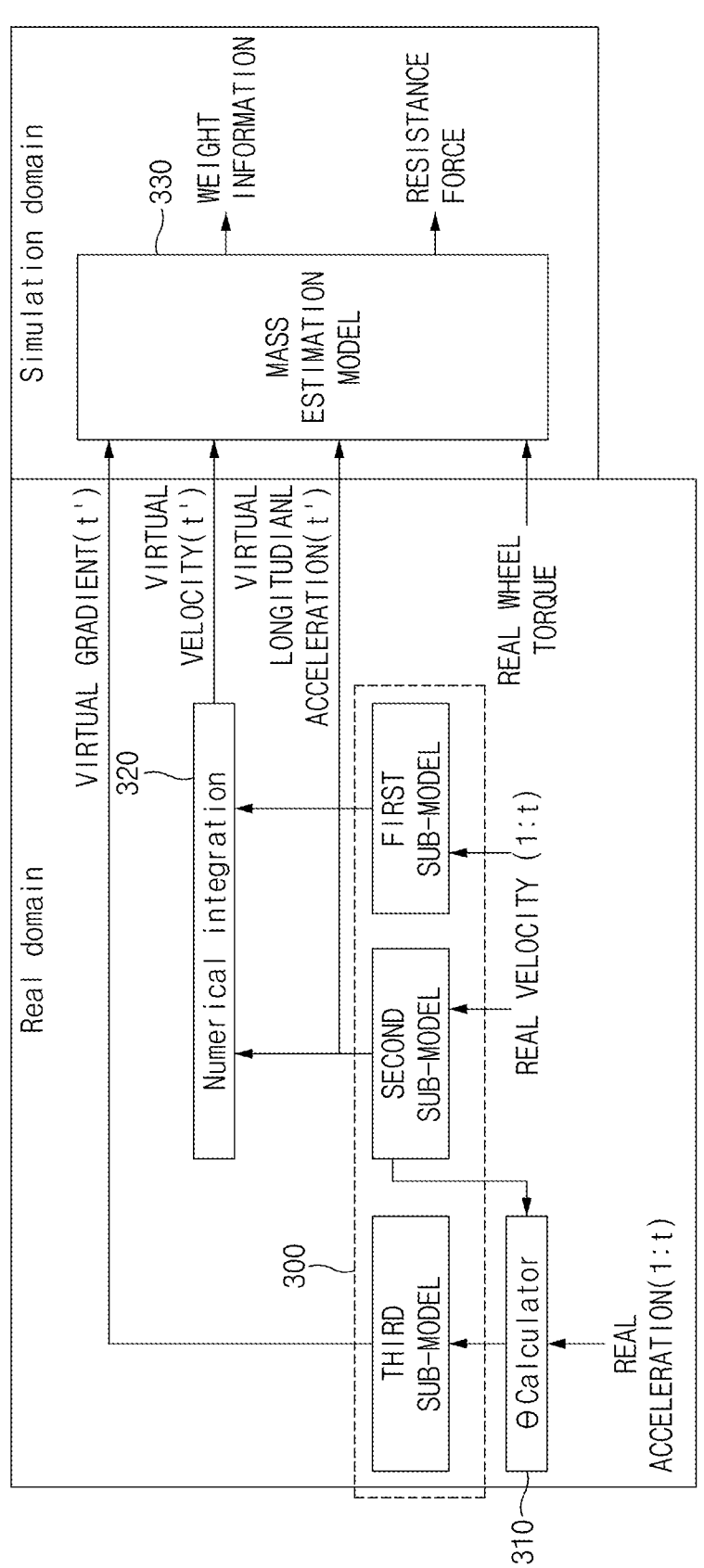
FIG. 3 is a drawing illustrating areal-to-virtual transformation model and a mass estimation model, in an apparatus for estimating a vehicle weight according to an embodiment of the present disclosure.

FIG. 3 is a drawing illustrating a real-to-virtual transformation model and a mass estimation model, in an apparatus for estimating a vehicle weight according to an embodiment of the present disclosure.

FIG. 3 illustrates a relationship between an input and output of a real-to-virtual transformation model 300 and an input and output of a mass estimation model 330. Particularly, the real-to-virtual transformation model 300 and the mass estimation model 330 may indicate models trained by a machine learning method. Hereinafter, for convenience of description in the specification, the real-to-virtual transformation model 300 and the mass estimation model 330 are mainly described as machine learning models.

An apparatus for estimating a vehicle weight (e.g., an apparatus 100 for estimating a vehicle weight in FIG. 1) may train a machine learning model (e.g., the real-to-virtual transformation model 300 and the mass estimation model 330). Illustratively, the machine learning model may include a neural network. The neural network may include a plurality of layers. Each layer may include a plurality of nodes. The node may have a node value determined based on an activation function. A node of any layer may be connected with a node (e.g., another node) of another layer through a link (e.g., a connection edge) with a connection weight. The node value of the node may be propagated to other nodes through the link. In an inference operation of the neural network, node values may be forward propagated in the direction of a next layer from a previous layer.

Illustratively, the forward propagation calculation in the machine learning model may indicate calculation of propagating a node value based on input data, in the direction of facing the output layer from the input layer of the machine learning model. In other words, anode value of the node may be propagated (e.g., forward propagated) to a node (e.g., a next node) of a next layer connected with the node through the connection edge. For example, the node may receive a value weighted by the connection weight from a previous node (e.g., a plurality of nodes) connected through the connection edge.

The node value of the node may be determined based on applying an activation function to the sum (e.g., weighted sum) of weighted values received from previous nodes. The parameter of the neural network may illustratively include the above-mentioned connection weight. The parameter of the neural network may be updated to be changed in a direction in which a loss function value, which will be described below, is targeted (e.g., a direction where a loss is minimized).

The trained machine learning model (e.g., the trained real-to-virtual transformation model 300 or the trained machine learning model 330) may indicate a model trained by means of machine learning. For example, the real-to-virtual transformation model 300 may be a trained machine learning model which outputs a training output (e.g., a virtual gradient t', a virtual velocity t', and virtual longitudinal acceleration t') from a training input (e.g., real acceleration (1:t) and a real velocity (1:t)). Furthermore, the mass estimation model 330 may be a trained machine learning model which outputs a training output (e.g., weight information and a resistance force) from a training input (e.g., a virtual gradient t', a virtual velocity t', and virtual longitudinal acceleration t').

The machine learning model may be generated by means of machine learning. A learning algorithm may include, for example, but is not limited to, supervised learning, unsupervised learning, semi-supervised leaning, or reinforcement learning.

The machine learning model may include a plurality of artificial network layers. In detail, the trained real-to-virtual transformation model 300 or the trained mass estimation model 330 may include a shared layer including at least one convolution operation and a plurality of classifier layers (e.g., task-specific layers) connected with the shared layer. An artificial network may be, but is not limited to, a combination of at least one of a deep neural network (DNN), a convolutional neural network (CNN), a U-net for image segmentation (U-net), a recurrent neural network (RNN), a restricted Boltzmann machine (RBM), a deep belief network (DBN), a bidirectional recurrent deep neural network (BRDNN), or deep Q-networks, or any combination thereof. Therefore, a detailed structure of the real-to-virtual transformation model 300 will be described below with reference to FIGS. 4A to 4C, and a detailed structure of the mass estimation model 330 will be described below with reference to FIG. 5.

For supervised learning, the above-mentioned machine learning model may be trained based on training data including a pair of a training input and a training output mapped to the training input. For example, the machine learning model may be trained to output a training output from a training input. The machine learning model while trained may output a temporary output in response to the training input and may be trained such that a loss of the temporary output and the training output (e.g., a training target) is minimized. A parameter of the machine learning model during a learning process (e.g., a connection weight between nodes/layers in the neural network) may be updated according to a loss. Such learning may be performed in the apparatus itself for estimating the vehicle weight in which the machine learning model is performed or may be performed by means of a separate server. The machine learning model, the training of which is completed, (e.g., the trained real-to-virtual transformation model 300 or the trained mass estimation model 330) may be stored in a memory (e.g., a memory 120 of FIG. 1).

The apparatus for estimating the vehicle weight may apply the real acceleration (1:t) and the real velocity (1:t) to the real-to-virtual transformation model 300 to obtain a virtual output set including a virtual gradient t', a virtual velocity t', and virtual longitudinal acceleration t'. For example, the real acceleration (1:t) may indicate acceleration about a time series including real acceleration at each of t time points, and the real velocity (1:t) may indicate a velocity about a time series including real velocities at each of t time points. Furthermore, the virtual gradient t' may indicate a virtual gradient at a target time point, the virtual velocity t' may indicate a virtual velocity at the target time point, and the virtual longitudinal acceleration t' may indicate virtual longitudinal acceleration at the target time point.

The apparatus for estimating the vehicle weight may apply the real velocity (1:t) to a first sub-model included in the real-to-virtual transformation model 300 to obtain an initial virtual velocity. For example, the first sub-model may indicate a model which obtains the real velocity (1:t) as an input and obtains the initial virtual velocity about a specific time point of the real velocity (1:t) as an output. For reference, herein, the specific time point may indicate, but is not limited to, the very first time point in the time series of the real velocity (1:t).

The apparatus for estimating the vehicle weight may apply the real velocity (1:t) to a second sub-model included in the real-to-virtual transformation model 300 to obtain the virtual longitudinal acceleration t'. For example, the second sub-model may indicate a model which obtains the real velocity (1:t) as an input and obtains the virtual longitudinal acceleration t' in the simulation environment as an output. The apparatus for estimating the vehicle weight may determine the virtual velocity t', based on the numerical integration 320 of the virtual longitudinal acceleration t' and the initial virtual velocity t'.

The virtual velocity t' according to an embodiment may be represented by equation 1 below.

$$V_{veh}(t) = V_{veh}(1) + \Delta t \sum_{i=1}^{t} a_{long}(i) \qquad \text{Equation 1}$$

Herein, $V_{veh}(t)$ may denote the virtual velocity t' at the target time point, $V_{veh}(1)$ may denote the initial virtual velocity, and $$\Delta t \Sigma_{i=1}^{t} a_{long}(i)$$

may denote the numerical integration 320 of the virtual longitudinal acceleration t'.

The apparatus for estimating the vehicle weight may determine a following gradient 310 of the vehicle, based on the real acceleration (1:t) and the virtual longitudinal acceleration t'.

The following gradient 310 according to an embodiment may be represented by Equation 2 below.

$$\theta = \sin^{-1}\left(\frac{1}{g}(a_{sensor} - a_{long})\right) \qquad \text{Equation 2}$$

Herein, $\theta$ may denote the following gradient 310 of the vehicle, $(a_{sensor} - a_{long})$ may denote the difference between the real acceleration (1:t) measured from the acceleration sensor and the virtual longitudinal acceleration t' obtained from the second sub-model, and $1/g$ may denote the reciprocal of the gravitational acceleration.

The real acceleration (1:t), $a_{sensor}$, measured from the acceleration sensor with respect to the road on which the vehicle is located may be represented as the sum of the virtual longitudinal acceleration t, $a_{long}$, and g sin($\theta$). Therefore, the apparatus for estimating the vehicle weight may determine the following gradient 310 of the vehicle, based on the real acceleration (1:t), the virtual longitudinal acceleration t', and the gravitational acceleration.

The apparatus for estimating the vehicle weight may apply the following gradient 310 to a third sub-model included in the real-to-virtual transformation model 300 to obtain the virtual gradient t'. In other words, the apparatus for estimating the vehicle weight may determine the following gradient 310 based on a value (e.g., the real acceleration (1:t)) obtained from a sensor and a value (e.g., the virtual longitudinal acceleration t') obtained from the second sub-model and may apply the determined following gradient 310 to the third sub-model to obtain the virtual gradient t' in the simulation environment.

The apparatus for estimating the vehicle weight may train the first to third sub-models to obtain the initial virtual velocity from the first sub-model, obtain the virtual longitudinal acceleration t' from the second sub-model, and obtain the virtual gradient from the third sub-model. In other words, the apparatus for estimating the vehicle weight may train the first to third sub-models before the target time point which is a time point when inference of each of the first to third sub-models is performed. Hereinafter, a description will be given in detail of a method for training the first to third sub-models included in the real-to-virtual transformation model 300 in the apparatus for estimating the vehicle weight.

The apparatus for estimating the vehicle weight may determine a first loss function for training the real-to-virtual transformation model 300, based on at least one of a weight of the vehicle prior to the target time point, longitudinal acceleration of the vehicle prior to the target time point, a velocity of the vehicle prior to the target time point, or a gradient of the vehicle prior to the target time point, or any combination thereof. In detail, the apparatus for estimating the vehicle weight may determine the first loss function for training each of the first to third sub-models included in the real-to-virtual transformation model 300, based on the at least one of the weight of the vehicle prior to the target time point, the longitudinal acceleration of the vehicle prior to the target time point, the velocity of the vehicle prior to the target time point, or the gradient of the vehicle prior to the target time point, or the any combination thereof.

The first loss function may include at least one of a mean square error based on the weight of the vehicle, a mean square error based on the longitudinal acceleration of the vehicle, a mean square error based on the velocity of the vehicle, or a mean square error based on the gradient of the vehicle, or any combination thereof.

The first loss function according to an embodiment may be represented by Equation 3 below.

$$\text{Loss} = MSE(\alpha, \hat{\alpha}) + MSE\left(\alpha_{long}^{sim}, \hat{\alpha}_{long}^{sim}\right) + MSE\left(V_{veh}^{sim}, \hat{V}_{veh}^{sim}\right) + MSE\left(\theta^{sim}, \hat{\theta}^{sim}\right) \qquad \text{Equation 3}$$

Herein, $MSE(\alpha, \hat{\alpha})$ may denote the mean square error based on the weight information of the vehicle, $$MSE\left(\alpha_{long}^{sim}, \hat{\alpha}_{long}^{sim}\right)$$

may denote the mean square error based on the longitudinal acceleration of the vehicle, $$MSE\left(V_{veh}^{sim}, \hat{V}_{veh}^{sim}\right)$$

may denote the mean square error based on the velocity of the vehicle, and $MSE(\theta^{sim}, \hat{\theta}_{sim})$ may denote the mean square error based on the gradient of the vehicle.

In other words, the apparatus for estimating the vehicle weight may include a physical quantity about the weight information, which is the output value of the mass estimation model 330, the training of which is ended, the longitudinal acceleration, the velocity, and the gradient in the first loss function for training the first to third sub-models. As a result, for example, the apparatus for estimating the vehicle weight may perform training for updating a weight of the third sub-model which obtains the virtual longitudinal acceleration t', based on information capable of being obtained from the first sub-model, the second sub-model, and the mass estimation model 330 as well as information about the virtual longitudinal acceleration t', in the process of training the third sub-model.

The apparatus for estimating the vehicle weight may apply a virtual output set at the target time point and a wheel torque at the target time point to the trained mass estimation model 330 to obtain weight information and a resistance force of the vehicle.

The weight information obtained from the trained mass estimation model 330 according to an embodiment may be represented by Equation 4 below.

$$\hat{\alpha} = \frac{\left(\hat{M} - M_0\right)}{M_0} \qquad \text{Equation 4}$$

Herein, $\hat{\alpha}$ may denote the weight information and may specifically denote the weight ratio of the vehicle in the weight information, $\hat{M}$ may denote the current weight of the vehicle, $M_0$ may denote the curb weight of the vehicle, and $\hat{M} - M_0$ may denote the load weight of the vehicle.

The apparatus for estimating the vehicle weight may train the mass estimation model 330 to obtain the weight information and the resistance force from the mass estimation model 330. In other words, the apparatus for estimating the vehicle weight may train the mass estimation model 330 before the target time point which is a time point when inference of the mass estimation model 330 is performed. Hereinafter, a description will be given in detail of the method for training the mass estimation model 330 in the apparatus for estimating the vehicle weight.

The apparatus for estimating the vehicle weight may determine a second loss function for training the mass estimation model 330, based on weight information of the vehicle prior to the target time point, a ratio between the weight information of the vehicle and a real wheel torque of the vehicle prior to the target time point, and a resistance force of the vehicle prior to the target time point.

The second loss function according to an embodiment may be represented by Equation 5 below.

$$Loss = MSE(\alpha, \hat{\alpha}) + MSE\left(\frac{\delta\alpha}{\delta T_{total}}, \frac{\delta\hat{\alpha}}{\delta T_{total}}\right) + MSE(F_{resist}, \hat{F}_{resist})$$

<div align="right">Equation 5</div>

Herein, $MSE(\alpha, \hat{\alpha})$ may denote the mean square error based on the weight information, $$MSE\left(\frac{\delta\alpha}{\delta T_{total}}, \frac{\delta\hat{\alpha}}{\delta T_{total}}\right)$$

may denote the mean square error based on the ratio between the weight information of the vehicle and the real wheel torque of the vehicle, and $MSE(F_{resist}, \hat{F}_{resist})$ may denote the mean square error based on the resistance force of the vehicle.

In other words, the apparatus for estimating the vehicle weight may include the real wheel torque, which is longitudinal dynamics information, and the resistance force applied to the vehicle as well as the weight information in the second loss function, thus guiding the mass estimation model 330 to perform inference based on dynamics.

The weight information according to an embodiment may be represented by Equation 6 below.

$$\frac{1}{M_0(a_{long} + g\sin(\theta))}\left(\frac{T_{total}}{R} - F_{resist}(a, V_{veh}, \theta, a_{long})\right) - 1$$

<div align="right">Equation 6</div>

Herein, $a_{long} + g\sin(0)$ may denote the sum of the virtual longitudinal acceleration t', $a_{long}$, and $g\sin(B)$, and $$\frac{T_{total}}{R} - F_{resist}(a, V_{veh}, \theta, a_{long})$$

may denote the net force applied to the vehicle.

For reference, Equation 6 above may indicate an equation represented by including the weight information a represented by Equation 4 above in the dynamics information. Therefore, the weight information represented by Equation 6 above may indicate the same value as the weight information represented by Equation 4 above. However, the weight information represented by Equation 4 above may indicate a value obtained and inferred by the mass estimation model 330, and the weight information represented by Equation 6 above may indicate dynamics information of the weight information.

According to an embodiment, the result of performing a partial derivative of the weight information of the vehicle using the real wheel torque of the vehicle may be represented by Equation 7 below.

$$\frac{\delta a}{\delta T_{total}} = \frac{1}{RM_0(a_{long} + g\sin(\theta))}$$

<div align="right">Equation 7</div>

Herein, $RM_0(a_{long} + g\sin(\theta))$ may denote the reciprocal of the result in which the partial derivative is performed using the real wheel torque in Equation 6 above and may specifically denote the result of multiplying the wheel diameter R of the vehicle, the curb weight $M_0$ of the vehicle, and the sum $a_{long} + g\sin(\theta)$ of the virtual longitudinal acceleration t', $a_{long}$, and $g\sin(\theta)$.

The apparatus for estimating the vehicle weight may train the mass estimation model 330, before training the real-to-virtual transformation model 300. The apparatus for estimating the vehicle weight may apply the real velocity and the real acceleration to the real-to-virtual transformation model 300, based on that the training of the mass estimation model 330 is completed, to obtain a first temporary output at a time point different from the target time point. Herein, the first temporary output may indicate the result of responding to the real velocity and the real acceleration, which are training inputs. The apparatus for estimating the vehicle weight may apply the first temporary output to the trained mass estimation model 330 to obtain a second temporary output different from the first temporary output. Herein, the second temporary output may indicate the result of responding to the first temporary output which is a training input.

The apparatus for estimating the vehicle weight may apply the first temporary output and the second temporary output to the loss function of the real-to-virtual transformation model 300 to train the real-to-virtual transformation model 300. In detail, the apparatus for estimating the vehicle weight may combine the trained mass estimation model 330 with the real-to-virtual transformation model 300, the training of which is in progress, to train the real-to-virtual transformation model 300. Furthermore, the apparatus for estimating the vehicle weight may include an output value of the mass estimation model 330 in the loss function (e.g., the first loss function) of the real-to-virtual transformation model 300. Therefore, the real-to-virtual transformation model 300 may be trained about weight information among output values of the mass estimation model 330 as well as an output value (e.g., a virtual gradient, a virtual velocity, or virtual longitudinal acceleration) obtained from each of the first to third sub-models.

Figure 4A:
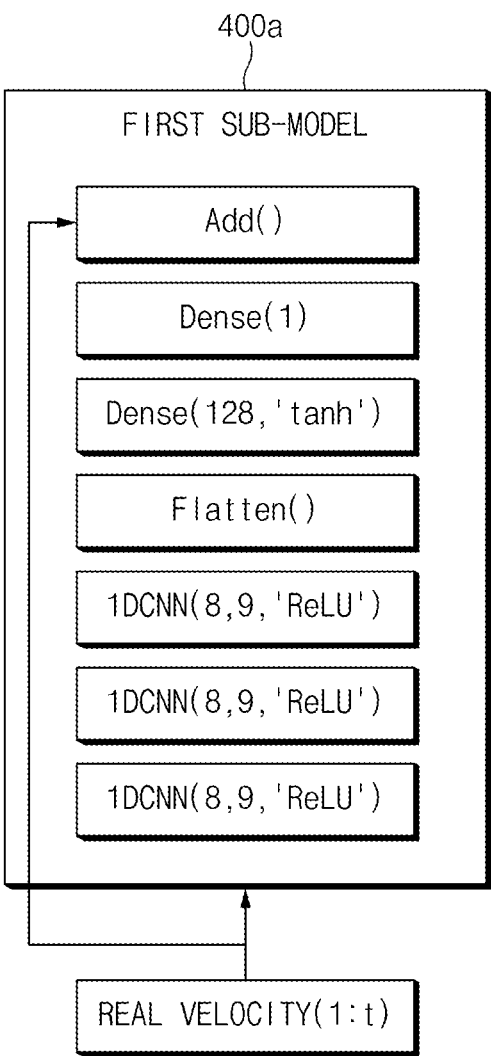
FIGS. 4A, 4B, and 4C are drawings illustrating a structure of a first sub-model, a structure of a second sub-model, and a structure of a third sub-model, which are included in a real-to-virtual transformation model, in an apparatus for estimating a vehicle weight according to an embodiment of the present disclosure.
Figure 4B:
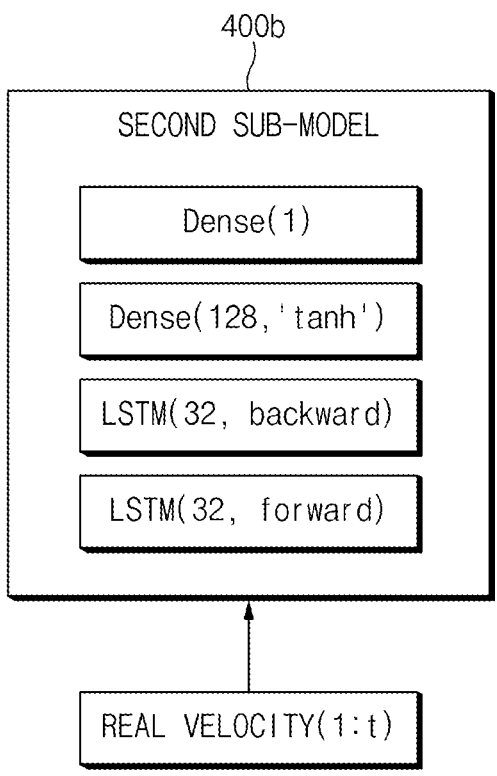
Figure 4C:
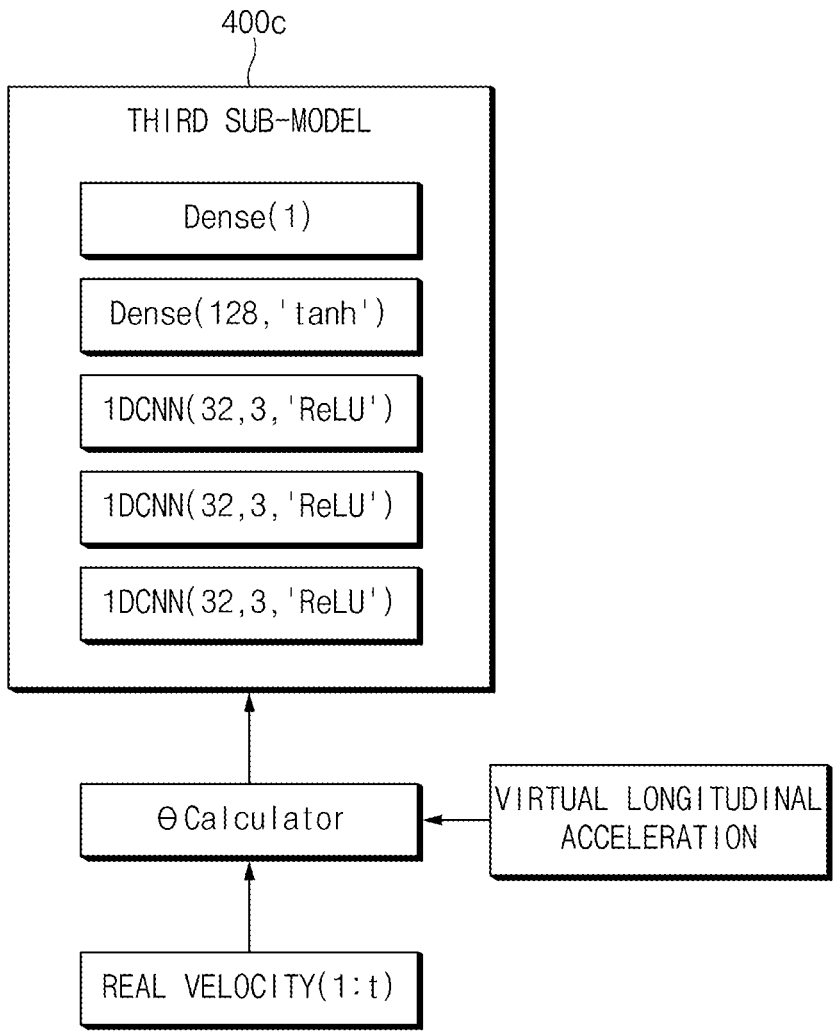

FIGS. 4A to 4C are drawings illustrating a structure of a first sub-model, a structure of a second sub-model, and a structure of a third sub-model, which are included in a real-to-virtual transformation model, in an apparatus for estimating a vehicle weight according to an embodiment of the present disclosure.

Referring to FIG. 4A, a first sub-model 400a may include a deep convolutional neural network (DCNN), a flatten network, and a fully connected neural network (FCNN), for obtaining an initial virtual velocity from areal velocity (1:t). The DCNN may include at least one "1DCNN(8,9, 'RELU'))" shown in FIG. 4A. For example, an apparatus for estimating a vehicle weight (e.g., an apparatus 100 for estimating a vehicle weight in FIG. 1) may apply the real velocity (1:t) to the DCNN of the first sub-model 400a to perform forward propagation operation. The apparatus for estimating the vehicle weight may apply a temporary output (e.g., node values of a node) obtained from the DCNN to the FCNN to obtain an initial virtual velocity.

Referring to FIG. 4B, a second sub-model 400b may include a recurrent neural network (RNN) include at least one long short term memory (LSTM) block, for obtaining virtual longitudinal acceleration from a real velocity (1:t). For example, the apparatus for estimating the vehicle weight may apply the real velocity (1:t) to the RNN of the second sub-model 400b to perform forward propagation operation.

The apparatus for estimating the vehicle weight may obtain virtual longitudinal acceleration by means of the forward propagation operation.

Herein, the LSTM block may include a plurality of gates such as an input gate, an output gate, and a forget gate. Particularly, a cell of the LSTM block may serve to memorize input values during random time intervals. Each of the above-mentioned three gates may function as an artificial neuron in a multi-layer feedforward RNN. The expression "long short term" may refer to the fact that it is able to model a memory in which the LSTM block is able to last for a long term. The LSTM is suitable for classifying, processing, and predicting a time series, when considering an unknown size among important events and a time difference in duration. Therefore, the apparatus for estimating the vehicle weight may use the second sub-block 400b including the LSTM block to reflect a relationship between important events (e.g., acceleration at each of a plurality of time points) composed of a series of times to obtain virtual longitudinal acceleration.

Referring to FIG. 4C, a third sub-model 400c may include a DCNN and a FCNN, for obtaining a virtual gradient from a gradient of the vehicle. For example, the apparatus for estimating the vehicle weight may apply real acceleration (1:t) and/or virtual longitudinal acceleration to a gradient calculator (e.g., which is shown as a theta calculator in FIG. 4C or is represented in Equation 2 above in FIG. 3) to obtain a following gradient. The apparatus for estimating the vehicle weight may apply the following gradient to the DCNN of the third sub-model 400c to perform forward propagation operation. The apparatus for estimating the vehicle weight may apply a temporary output (e.g., node values of a node) obtained from the DCNN to the FCNN to obtain a virtual gradient.

Figure 5:
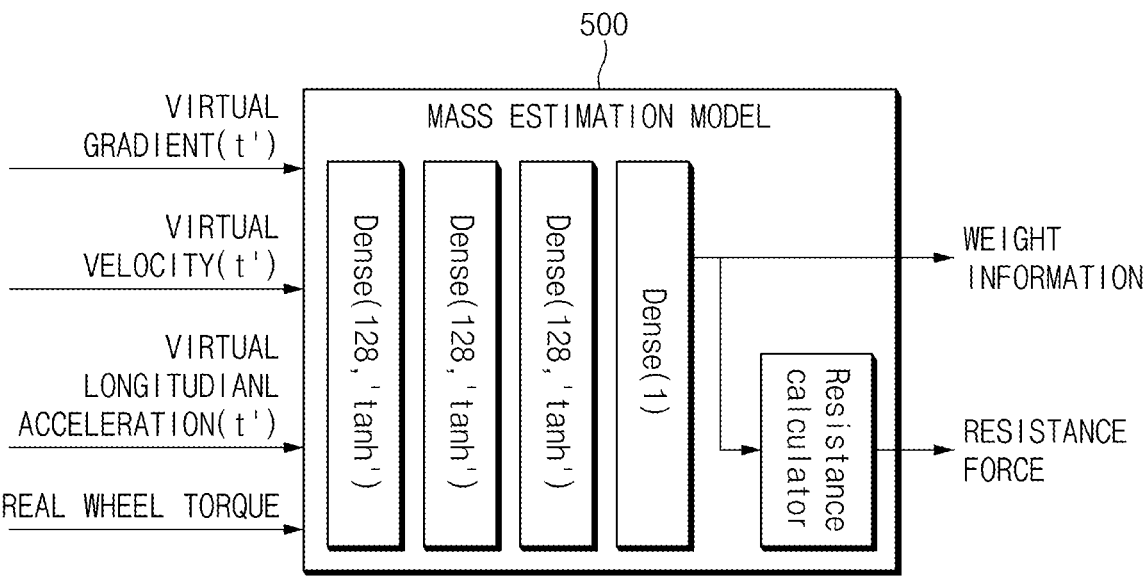
FIG. 5 is a drawing illustrating a structure of a mass estimation model, in an apparatus for estimating a vehicle weight according to an embodiment of the present disclosure.

FIG. 5 is a drawing illustrating a structure of a mass estimation model, in an apparatus for estimating a vehicle weight according to an embodiment of the present disclosure.

A mass estimation model 500 may include an FCNN associated with obtaining weight information of a vehicle and a resistance force of the vehicle from a virtual output set at a target time point and a real wheel torque at the target time point. The FCNN may include at least one Dense(128, 'tanh') shown in FIG. 5. For example, an apparatus for estimating a vehicle weight (e.g., an apparatus 100 for estimating a vehicle weight in FIG. 1) may apply the virtual output set to the FCNN of the mass estimation model 500 to perform forward propagation operation. The apparatus for estimating the vehicle weight may obtain weight information and a resistance force, based on a temporary output (e.g., node values of a node) obtained from a DCNN.

Figure 6A:
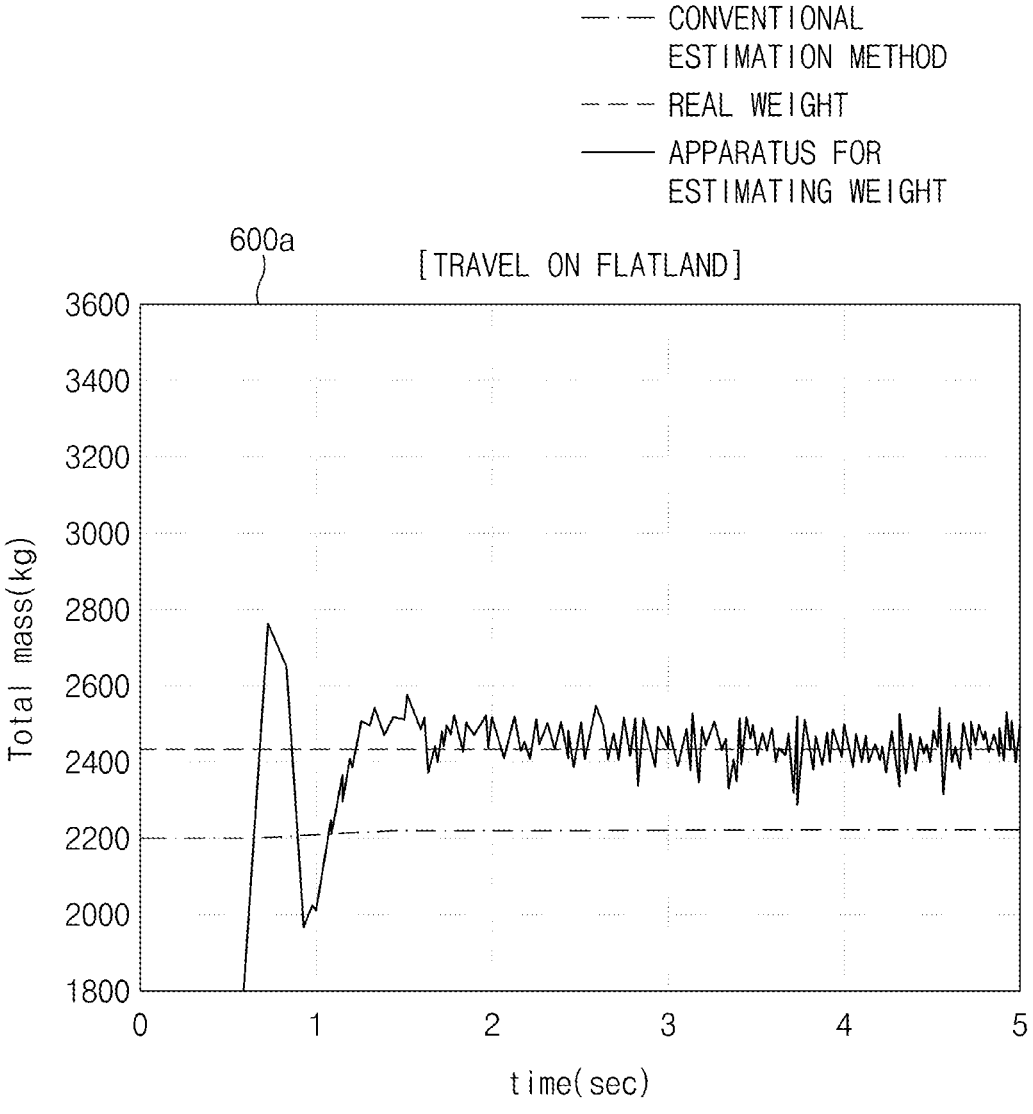
FIGS. 6A and 6B are drawings illustrating the result of comparing a weight estimated by an apparatus for estimating a vehicle weight according to an embodiment of the present disclosure with a weight estimated by the recursive least square.
Figure 6B:
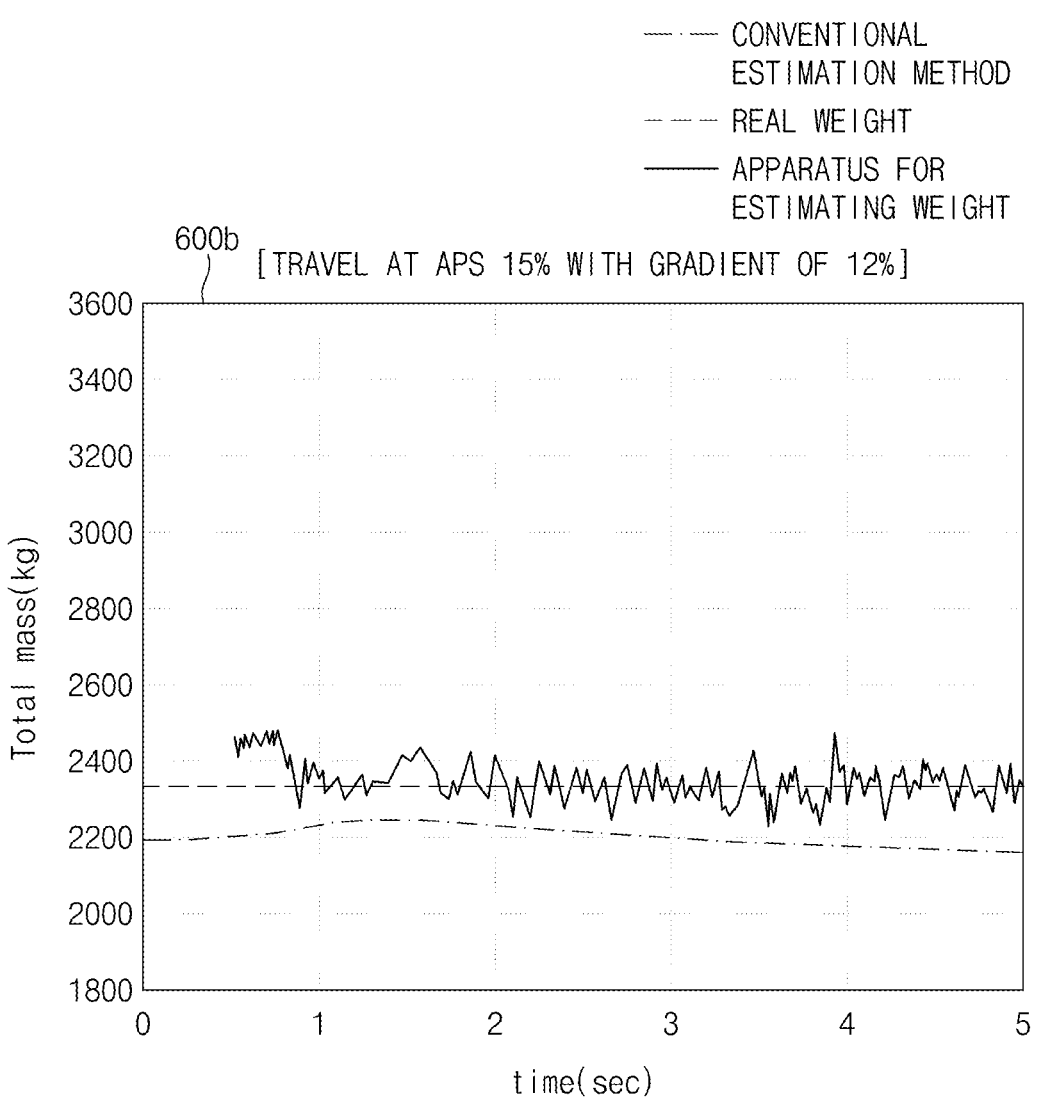

FIGS. 6A and 6B are drawings illustrating the result of comparing a weight estimated by an apparatus for estimating a vehicle weight according to an embodiment of the present disclosure with a weight estimated by the recursive least square.

Referring to FIG. 6A, the horizontal axis of a graph 600a indicates time, and the vertical axis of the graph 600a indicates the estimated weight of the vehicle. Furthermore, the graph 600a indicates the estimated weight of the vehicle in a situation where the vehicle travels on a flatland. For example, when a real weight of the vehicle is measured as about 2400 kg in a time from 0 second to 5 seconds, an existing estimation method (e.g., a state estimation algorithm based on the extended Kalman filter or the recursive least square) may estimate the weight of the vehicle as about 2200 kg.

Otherwise, an apparatus for estimating a vehicle weight (e.g., an apparatus 100 for estimating a vehicle weight in FIG. 1) may estimate a weight close to the real weight of the vehicle, in the remaining time interval except for a time interval from 0 second to about 1.2 seconds. Thus, the graph 600a may indicate that the weight estimated by the apparatus for estimating the vehicle weight is closer to the real weight of the vehicle than the existing estimation method, in a situation where the vehicle travels on the flatland.

Referring to FIG. 6B, the horizontal axis of a graph 600b indicates time, and the vertical axis of the graph 600b indicates the estimated weight of the vehicle. Furthermore, the graph 600b indicates the estimated weight of the vehicle in a situation where the vehicle travels at accel-pedal position sensor (APS) 15% on a road with a gradient of 12%. For example, when a real weight of the vehicle is measured as about 2370 kg in a time from 0 second to 5 seconds, the existing estimation method (e.g., the state estimation algorithm based on the extended Kalman filter or the recursive least square) may estimate the weight of the vehicle as about 2200 kg. Furthermore, the existing estimation method may be to estimate a weight higher than 2200 kg from 1 second to 3 seconds and estimate a weight lower than 2200 kg from 3 seconds to 5 seconds, thus estimating a weight which lacks consistency.

Otherwise, the apparatus for estimating the vehicle weight (e.g., the apparatus 100 for estimating the vehicle weight in FIG. 1) may estimate a weight close to the real weight of the vehicle, in the remaining time interval except for a time interval from 0 second to about 0.8 seconds. Thus, the graph 600b may indicate that the weight estimated by the apparatus for estimating the vehicle weight is closer to the real weight of the vehicle than the existing estimation method, in a situation where the vehicle travels at the APS 15% on the road with the gradient of 12%.

Figure 7:
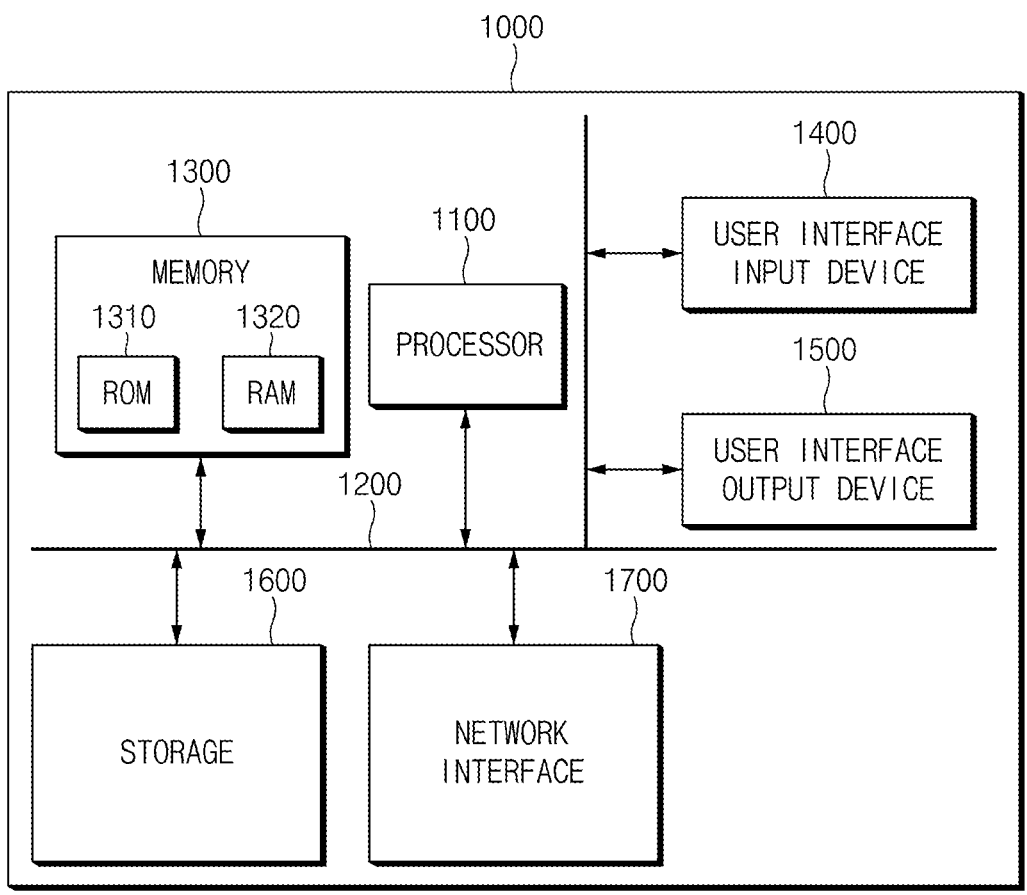
FIG. 7 illustrates a computing system associated with an apparatus for estimating a vehicle weight or a method for estimating a vehicle weight according to an embodiment of the present disclosure.

FIG. 7 is a drawing illustrating a computing system associated with an apparatus for estimating a vehicle weight or a method for estimating a vehicle weight according to an embodiment of the present disclosure.

Referring to FIG. 7, a computing system 1000 about the apparatus for estimating the vehicle weight or the method for estimating the vehicle weight may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The above-described embodiments may be implemented with hardware components, software components, and/or a combination of hardware components and software components. For example, the devices, methods, and components described in the embodiments may be implemented using general-use computers or special-purpose computers, such as a processor, a controller, an arithmetic logic unit (ALU), a digital signal processor, a microcomputer, afield programmable array (FPGA), a programmable logic unit (PLU), a microprocessor, or any device which may execute instructions and respond. A processing unit may perform an operating system (OS) or a software application running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively instruct the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one computer-readable storage media.

The methods according to embodiments may be implemented in the form of program instructions which may be executed through various computer means and may be recorded in computer-readable media. The computer-readable media may include program instructions, data files, data structures, and the like alone or in combination, and the program instructions recorded on the media may be specially designed and configured for an example or may be known and usable to those skilled in the art of computer software. Examples of computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter.

The above-described hardware devices may be configured to act as one or a plurality of software modules to perform the operations of the embodiments, or vice versa.

Even though the embodiments are described with reference to restricted drawings, it may be obviously to one skilled in the art that the embodiments are variously changed or modified based on the above description. For example, adequate effects may be achieved even if the foregoing processes and methods are carried out in different order than described above, and/or the aforementioned components, such as systems, structures, devices, or circuits, are combined or coupled in different forms and modes than as described above or be substituted or switched with other components or equivalents.

A description will be given of effects of the apparatus for estimating the vehicle weight and the method therefor according to an embodiment of the present disclosure.

According to at least one of embodiments of the present disclosure, the apparatus for estimating the vehicle weight may apply a small amount of real data to the real-to-virtual transformation model to obtain a large amount of simulation data and improve the accuracy of a deep learning model for estimating a physical quantity and may predict changes in a braking distance, an acceleration characteristic, a cornering characteristic, and the like of the vehicle according to the estimated weight to improve the safety of the vehicle while driving.

Furthermore, according to at least one of embodiments of the present disclosure, the apparatus for estimating the vehicle weight may include longitudinal dynamics information in a loss function in the process of training the mass estimation model such that the mass estimation model may perform inference based on dynamics.

Furthermore, according to at least one of embodiments of the present disclosure, the apparatus for estimating the vehicle weight may predict a maintenance timing suitable for a part influenced by a weight among expendables of the vehicle, which require combined maintenance, using the real-to-virtual transformation model and the mass estimation model, thus improving vehicle management efficiency.

In addition, various effects ascertained directly or indirectly through the present disclosure may be provided.

Therefore, other implements, other embodiments, and equivalents to claims are within the scope of the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus for estimating a vehicle weight, the apparatus comprising:
   a memory storing computer-executable instructions; and
   at least one processor configured to access the memory and execute the instructions;
   wherein the at least one processor is configured to;
   apply a real velocity and real acceleration to a trained real-to-virtual transformation model to obtain a virtual output set at a target time point, the virtual output set including a virtual gradient of a vehicle, a virtual velocity of the vehicle, and virtual longitudinal acceleration of the vehicle;

apply the virtual output set at the target time point and a real wheel torque at the target time point to a trained mass estimation model to obtain weight information of the vehicle;

determine a first loss function for training the real-to-virtual transformation model, based on at least one of weight information of the vehicle prior to the target time point, longitudinal acceleration of the vehicle prior to the target time point, a velocity of the vehicle prior to the target time point, or a gradient of the vehicle prior to the target time point, or any combination thereof;

determine a second loss function for training the mass estimation model, based on weight information of the vehicle prior to the target time point, a ratio between the weight information of the vehicle and a real wheel torque of the vehicle prior to the target time point, and a resistance force of the vehicle prior to the target time point;

include longitudinal dynamics information in the second loss function in the process of training the mass estimation model; and predict a maintenance timing suitable for a part influenced by a weight among expendables of the vehicle, which require combined maintenance, using the real-to-virtual transformation model and the mass estimation model;

wherein the virtual gradient is configured to indicate a gradient of the vehicle in a simulation environment; and wherein the virtual velocity is configured to indicate a velocity of the vehicle in the simulation environment; and wherein the virtual longitudinal acceleration is configured to indicate longitudinal acceleration of the vehicle in the simulation environment; and wherein the real-to-virtual transformation model includes:

a first sub-model configured to obtain an initial virtual velocity from the real velocity;

a second sub-model configured to obtain the virtual longitudinal acceleration from the real velocity; and a third sub-model configured to obtain the virtual gradient from a gradient of the vehicle.

2. The apparatus of claim 1, wherein the at least one processor is configured to apply the real velocity to the first sub-model to obtain the initial virtual velocity, to apply the real velocity to the second sub-model to obtain the virtual longitudinal acceleration, and to determine the virtual velocity, based on numerical integration of the virtual longitudinal acceleration and the initial virtual velocity.

3. The apparatus of claim 2, wherein the at least one processor is configured to determine a following gradient of the vehicle, based on the real acceleration and the virtual longitudinal acceleration, and applies the following gradient to the third sub-model to obtain the virtual gradient.

4. The apparatus of claim 1, wherein the first sub-model includes a deep convolutional neural network (DCNN), a flatten network, and a fully connected neural network (FCNN), wherein the second sub-model includes a recurrent neural network (RNN) including at least one long short term memory (LSTM) block, or wherein the third sub-model includes a DCNN and an FCNN.

5. The apparatus of claim 1, wherein the at least one processor is configured to train each of the first sub-model, the second sub-model, and the third sub-model included in the real-to-virtual transformation model, based on the first loss function; and

wherein the first loss function includes at least one of a mean square error based on the weight information of the vehicle, a mean square error based on the longitudinal acceleration of the vehicle, a mean square error based on the velocity of the vehicle, or a mean square error based on the gradient of the vehicle, or any combination thereof.

6. The apparatus of claim 1, wherein the second loss function includes at least one of a mean square error based on the weight information of the vehicle, a mean square error based on the ratio between the weight information of the vehicle and the real wheel torque of the vehicle, or a mean square error based on the resistance force of the vehicle, or any combination thereof.

7. The apparatus of claim 1, wherein the mass estimation model includes an FCNN associated with obtaining the weight information of the vehicle and a resistance force of the vehicle from the virtual output set at the target time point and the real wheel torque at the target time point.

8. The apparatus of claim 1, wherein the at least one processor is configured to:

train the mass estimation model, before training the real-to-virtual transformation model;

apply the real velocity and the real acceleration to the real-to-virtual transformation model to obtain a first temporary output at a time point different from the target time point, based on that the training of the mass estimation model is completed;

apply the first temporary output to the trained mass estimation model to obtain a second temporary output different from the first temporary output; and apply the first temporary output and the second temporary output to a loss function of the real-to-virtual transformation model to train the real-to-virtual transformation model.

9. A method for estimating a vehicle weight, the method comprising:

applying, by a processor, a real velocity and real acceleration to a trained real-to-virtual transformation model to obtain a virtual output set at a target time point, the virtual output set including a virtual gradient of a vehicle, a virtual velocity of the vehicle, and virtual longitudinal acceleration of the vehicle;

applying, by the processor, the virtual output set at the target time point and a real wheel torque at the target time point to a trained mass estimation model to obtain weight information of the vehicle;

determining a first loss function for training the real-to-virtual transformation model, based on at least one of weight information of the vehicle prior to the target time point, longitudinal acceleration of the vehicle prior to the target time point, a velocity of the vehicle prior to the target time point, or a gradient of the vehicle prior to the target time point, or any combination thereof; and determining a second loss function for training the mass estimation model, based on weight information of the vehicle prior to the target time point, a ratio between the weight information of the vehicle and a real wheel torque of the vehicle prior to the target time point, and a resistance force of the vehicle prior to the target time point;

including longitudinal dynamics information in the second loss function in the process of training the mass estimation model; and predicting a maintenance timing suitable for a part influenced by a weight among expendables of the vehicle, which require combined maintenance, using the real-to-virtual transformation model and the mass estimation model;

wherein the virtual gradient is configured to indicate a gradient of the vehicle in a simulation environment; and wherein the virtual velocity is configured to indicate a velocity of the vehicle in the simulation environment; and wherein the virtual longitudinal acceleration is configured to indicate longitudinal acceleration of the vehicle in the simulation environment; and wherein the real-to-virtual transformation model includes:

a first sub-model configured to obtain an initial virtual velocity from the real velocity;

a second sub-model configured to obtain the virtual longitudinal acceleration from the real velocity; and a third sub-model configured to obtain the virtual gradient from a gradient of the vehicle.

10. The method of claim 9, wherein obtaining the virtual output set includes:

applying the real velocity to the first sub-model to obtain the initial virtual velocity;

applying the real velocity to the second sub-model to obtain the virtual longitudinal acceleration; and determining the virtual velocity, based on numerical integration of the virtual longitudinal acceleration and the initial virtual velocity.

11. The method of claim 10, further comprising:

determining a following gradient of the vehicle, based on the real acceleration and the virtual longitudinal acceleration; and applying the following gradient to the third sub-model to obtain the virtual gradient.

12. The method of claim 9, wherein the first sub-model includes a deep convolutional neural network (DCNN), a flatten network, and a fully connected neural network (FCNN), wherein the second sub-model includes a recurrent neural network (RNN) including at least one long short term memory (LSTM) block, or wherein the third sub-model includes a DCNN and an FCNN.

13. The method of claim 9, wherein determining the first loss function includes:

training each of the first sub-model, the second sub-model, and the third sub-model included in the real-to-virtual transformation model, based on the first loss function; and wherein the first loss function includes at least one of a mean square error based on the weight information of the vehicle, a mean square error based on the longitudinal acceleration of the vehicle, a mean square error based on the velocity of the vehicle, or a mean square error based on the gradient of the vehicle, or any combination thereof.

14. The method of claim 9, wherein the second loss function includes at least one of a mean square error based on the weight information of the vehicle, a mean square error based on the ratio between the weight information of the vehicle and the real wheel torque of the vehicle, or a mean square error based on the resistance force of the vehicle, or any combination thereof.

15. The method of claim 9, wherein the mass estimation model includes an FCNN associated with obtaining the weight information of the vehicle and a resistance force of the vehicle from the virtual output set at the target time point and the real wheel torque at the target time point.

16. The method of claim 9, further comprising:

training, by the processor, the mass estimation model, before training the real-to-virtual transformation model;

applying the real velocity and the real acceleration to the real-to-virtual transformation model to obtain a first temporary output at a time point different from the target time point, based on that the training of the mass estimation model is completed;

applying the first temporary output to the trained mass estimation model to obtain a second temporary output different from the first temporary output; and applying the first temporary output and the second temporary output to a loss function of the real-to-virtual transformation model to train the real-to-virtual transformation model.

* * * * *